April 12, 1938.   L. E. BOOTH   2,113,823
FILTER
Filed Jan. 14, 1935
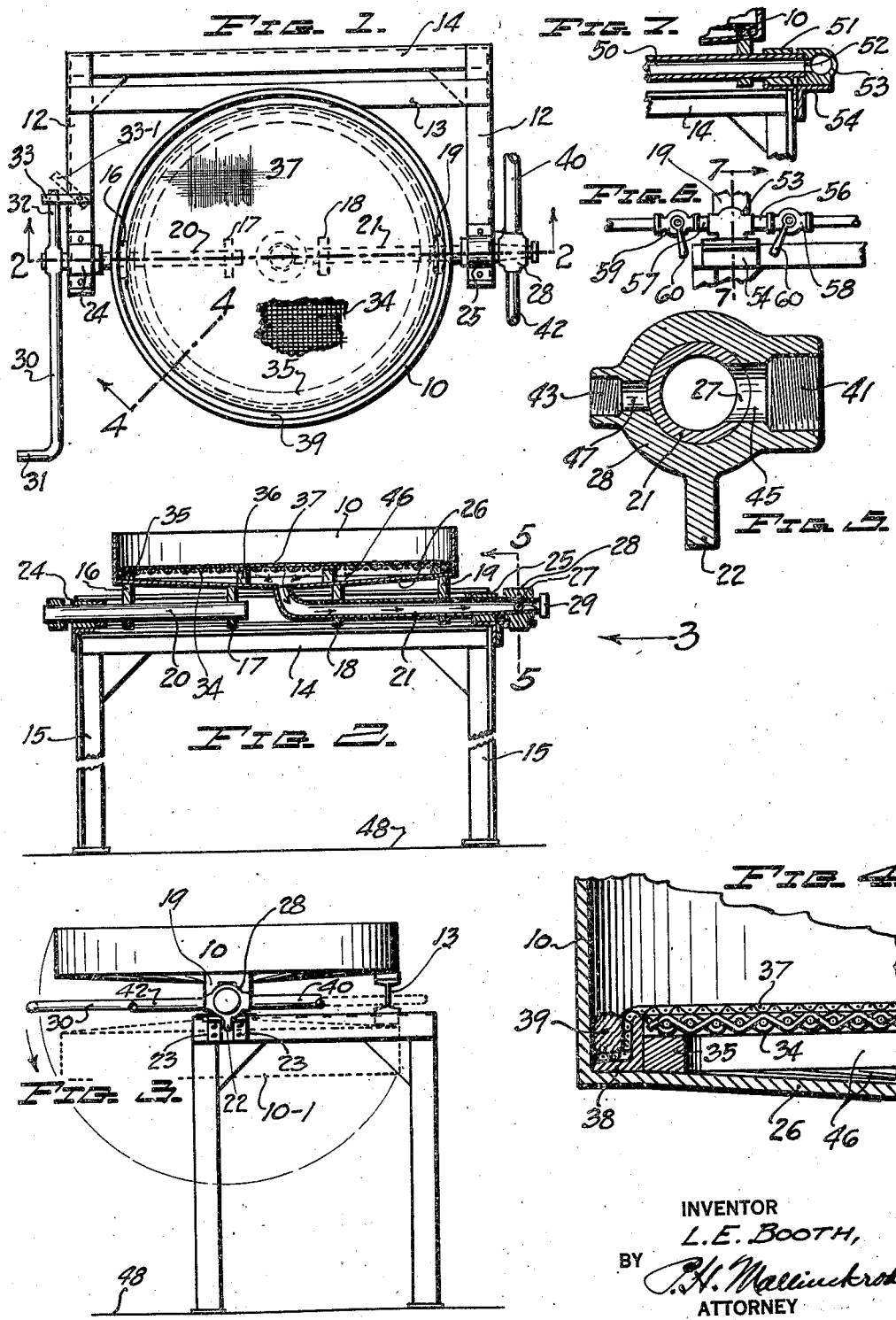
INVENTOR
L. E. BOOTH,
BY P. H. Mallinckrodt.
ATTORNEY Patented Apr. 12, 1938

2,113,823

UNITED STATES PATENT OFFICE 2,113,823

FILTER

Lionel E. Booth, Salt Lake City, Utah, assignor to The Galigher Company, Salt Lake City, Utah, a corporation of Utah Application January 14, 1935, Serial No. 1,686

3 Claims. (Cl. 210—149)

This invention relates to a filter, and more particularly, a dumping filter with automatic compressed air discharge.

The principal objects of this invention are to provide a filter which shall:

First.—Be invertible to discharge the contents.

Second.—Have a vacuum connection for hastening the filtering, and a connection for compressed air to assist in dumping the filter cake and at the same time, to clean the filtering medium.

Third.—Be automatic in its action in changing from the vacuum connection to the compressed air connection in dumping, and vice versa when returning to the filtering position.

Fourth.—Be convenient and efficient in operation, and particularly adapted for small metallurgical and other plants.

Fifth.—Be simple and inexpensive in construction.

Sixth.—Be durable in service.

In attaining these objects, I employ an open filter pan of rather shallow depth, which has a filtering medium spaced apart from the bottom, and which is pivotally mounted so that it can be mechanically inverted. In the normal or filtering position of the pan, a space between the filtering medium and the bottom of the pan is in communication with a vacuum pump or other vacuum-producing apparatus. In the inverted or dumping position, this same space is in communication with a source of compressed air so that as the pan nears the position of complete inversion, the filter cake is exposed to a suddenly applied air pressure on the bottom of the filtering medium, which, in addition to gravity, acts to quickly and efficiently expel the filter cake from the pan.

The pan is supported on a frame which has two side members and a third member joining the side members near their rear extremities, thus giving the frame approximately an inverted U-shape when viewed from the front. The pivotal mounting of the pan rests near the extremities of the U-legs, and the rear half of the pan occupies the major portion of the U-figure, permitting only a relatively small portion of the pan to rest on the rear member. The entire front half of the pan is unobstructed, and therefore, freely accessible to the operator, this being essential to rapid manipulation. The front half of the pan overhangs the pivotal axis and normally the pan is poised ready to be instantly tipped over with little manual effort.

In the normal position of the pan, a radius arm extends from the pivotal axis so as to be releasably locked. This holds the filter pan in the upright position. In dumping, the pan swings around the pivotal axis, and in doing so, the underside of the front of the pan strikes against the aforesaid rear member as a stop, thus limiting the swing of the pan to substantially 180 degrees, while the impact of the pan against the rear member frequently aids in loosening the filter cake.

In changing from the filtering position to the dumping position, the vacuum connection is automatically shut off, and the compressed air connection opened, while in returning the pan from the dumping position back to the filtering position, the compressed air is automatically shut off, and connection with the vacuum-producing means, reestablished.

The pivotal mounting of the filter pan includes a hollow shaft whose axis coincides with the pivotal axis. In the normal position of the pan, its outlet or lowest point is considerably above the pivotal axis, and the outlet drains into the hollow shaft. In this position of the pan, its entire structure is located above the U-shaped frame, which is horizontally disposed, and the rear portion of the pan rests on a rear member of this frame.

The features of this invention, for which the protection of Letters Patent of the United States is desired, are collectively grouped in the claims concluding this specification.

In the drawing, which illustrates a desirable embodiment of the present invention.

Fig. 1 represents a plan:

Fig. 2, a vertical axial section taken on line 2—2 in Fig. 1;

Fig. 3, a side elevation viewed in the direction of the arrow 3;

Fig. 4, a fragmentary section through the pan taken on the line 4—4 in Fig. 1, but drawn to a scale considerably enlarged;

Fig. 5, a vertical section taken through a two-way valve on the line 5—5 in Fig. 2, the scale to which the valve is drawn, being considerably enlarged, and parts in the background, omitted;

Fig. 6, a fragmentary side elevation looking from the right in Figs. 1 and 2; and, Fig. 7, a vertical section taken on the line 7—7 in Fig. 6.

Referring to the drawing, the numeral 10 indicates a filter pan pivotally supported on a substantially U-shaped horizontal frame which may be composed of the side pieces 12, the back piece 14, and the legs 15, the front part of the frame being open to accommodate the pan in its transition from the normal to the dumping position and back again.

The pan may be mounted in various ways to achieve the desired end, but I have found it expedient to employ a shaft 20 and a pipe 21, these two being in axial alignment with each other and coincident with the pivotal axis of the pan. The pan is carried on the shaft by means of the rigidly attached brackets 16 and 17, and on the pipe by means of the rigidly attached brackets 18 and 19.

Near its outer end, the shaft may be journaled in a bearing 24, while the pipe near its outer end, may be journaled in a bearing 25. The inner end of the pipe may carry an elbow or gooseneck, and be connected to the pan, watertight, at a suitable point, for instance, the center of the pan, the bottom 26 being dished so as to form an outlet at the lowest point of the pan and be adapted to drain into the pipe 21. The pipe 21, near its outer end, has a port 27, and is preferably tapered to form a plug valve, the end of the pipe being closed as indicated at 29, and the plug valve portion being ground to fit a valve casing 28. The valve casing may be kept from turning with the valve, by means of the depending lug 22, held between brackets 23. It will be noted that the pipe 21 forms a hollow shaft whose axis is considerably lower than the lowest or outlet point of the pan in its upright position, and at least partially supports the pan.

At its outer end the shaft 20 may carry a rigidly mounted crank 30, by means of which an operator, grasping the handle 31, may conveniently invert the pan by rotating it about the shaft and pipe axis. Normally, one end of the pan rests on a support, such as the beam 13, spaced apart from the pivot, while the pan is held securely in position by means of a relatively short arm 32 forming an integral part of the crank 30. The arm 32 is normally held under a movable latch 33, but when this latch is moved over into the position indicated by the dotted lines 33—1, the pan is free to be inverted. When the pan is swung into the inverted position, indicated by dotted lines in Fig. 3, the front of the pan follows the arrow until its impact is taken up by the lower portion of the beam 13.

Inside the pan, and suitably spaced apart from its bottom, is a relatively heavy perforate false bottom 34, which may be made of wire screen resting on a circumferential support 35 and on cross-supports 36. Spread over the screen 34 is a filtering medium 37, Fig. 5, which may consist of canvas or any other suitable fabric, and may be held in place by lapping its edge portion down into a circumferential recess within the angular member 38 being wedged into place therein by means of an annular filler 39, consisting of oakum, ordinary rope or other suitable material.

In use, a vacuum line 40 is connected to the valve casing, for instance by screwing into the bell-end 41, Fig. 5, the vacuum line extending to a vacuum pump or other suitable apparatus (not shown). In much the same way, a compressed-air line 42 may be connected to the valve casing, by screwing into the bell-end 43, the line 42 extending to an air-compressor or other suitable source of compressed air (not shown).

In the filtering position, the port 27 registers with a port 45 in the valve housing, the latter port leading into the vacuum line.

The liquid to be filtered may be placed in the pan on and above the filtering medium 37; as the suction is applied liquid is drawn down through the filtering medium into the space 46, from where the filtrate drains into the pipe 21 and passes out through the vacuum line 40. After sufficient filter-cake has accumulated on the filter in the pan, the operator opens the latch 33, and by means of the crank 30, inverts the pan, causing the latter to rotate through substantially 180 degrees, which brings the port 27, Fig. 5, into registry with a port 47 leading into the compressed-air line 42, communication with the vacuum line having meanwhile been closed off. The inverted position of the pan is shown by the dotted lines 10—1 in Fig. 3, and shortly before this position has been reached, the admission of compressed air through the ports 47 and 27 and the pipe 21 into the space 46, will have exerted its pressure upon the bottom of the filter medium to assist gravity in ejecting the filter cake from the pan, dumping it either onto the floor 48, or into a suitable receptacle (not shown, resting on the floor.

In returning the empty pan to its original position by means of the crank 30, the operator automatically switches the compressed air off and reestablishes communication with the vacuum pump through the vacuum line, thus leaving the filter in readiness to accumulate another batch of filter cake.

If desired, the filtering medium instead of consisting of textile fabric such as canvas, may be formed of a bed of sand or other similar substance resting directly on the screen 34. In such a case, the filtering medium contains the solids removed from the liquid, the sand with foreign solids being dumped together, and the foreign solids afterwards removed from the sand by washing. The cleansed sand can then be returned to the pan. This procedure is followed where a murky liquid is to be clarified and the filtrate is the valuable substance to be removed.

While the automatic switching from vacuum line to compressed-air line or vice versa, as heretofore described, is the preferred method of operation, yet some of the advantages of the invention may be secured by providing manually operated valves to accomplish the desired switching. Such a construction is shown in Figs. 6 and 7, where the hollow shaft 50 serves as a support for the pan, this shaft being rotatably mounted in a bearing 51. The outer end of the hollow shaft 50 terminates in a ground joint at 52, within a stationary T-fitting 53 supported on a bracket 54. The vacuum line may enter the T-fitting at 56, and the compressed-air line at 57, the vacuum line being controlled by means of a valve 58, and the compressed-air line by means of a valve 59, both valves being manually operated by means of handles 60. Thus, when the pan is in the normal position, communication with the vacuum line is opened through the valve 58, this valve being closed before the pan is inverted. After inversion, communication between the pan and the compressed-air line is established by means of valve 59, this valve being again closed before the pan is returned to the normal position.

Should there ever be occasion to do so, it is obvious that the use of the vacuum and compressed-air lines, as shown in the present drawing, could be interchanged without making any structural changes in the apparatus itself.

In drawing off the filtrate, any suitable or usual means, such as a receiver (not shown) for the disposal of the filtrate, may be connected to the vacuum line.

The action of the compressed air in forcibly opening passages through the screen 34 and the filtering medium, that may have become clogged during the process of filtering, will be readily understood without further explanation.

In recapitulation, it may be stated that the mass of the empty pan structure in its upright position, has its center of gravity high above the rotative axis, and is naturally in a state of unstable equilibrium. In order to dump the pan, the unstable equilibrium is disturbed, and the downward, inverting travel of the pan structure causes the pan structure to be violently unbalanced for the reason that it is freely exposed to the action of gravity. Thus, the inversion of the pan structure is motivated by the acceleration of gravity, and results in the forcible discharge of filter cake from the pan. The discharge of the filter cake is greatly facilitated by the momentum acquired by the swinging pan structure and the abrupt striking of the bottom of the pan against the stationary stop member, in this instance, beam 13. The sharp impact produces an irresistable force effective to jar loose any caked material clinging to the pan.

It is a constructional advantage of the present showing, that the pan in the upright position and at one extremity thereof transversely remote from the rotative axis, is supported at least partially, by the stationary member 13, and that in the final inverted position, the opposite extremity of the pan again strikes against this same member 13.

While specific details are shown and described herein in connection with my invention, these are not necessarily all in the preferred forms and therefore, I reserve the right to make such minor changes as properly come within the spirit and scope of the following claims.

Having fully described my invention, what I claim is:

1. A filter, including in combination, a filter pan having a conductor for liquid leading out of the bottom thereof, a shaft in axial alignment with the said conductor, bearings in which the shaft and the conductor are respectively rotatable for the purpose of inverting the said pan from a normal to a dumping position, a U-shaped frame near whose leg extremities the said bearings are mounted so as to cause substantially one-half of the filter pan to overlap the U-area and the other half to overhang the rotation axis of the said shaft and conductor, means for establishing communication between the said conductor and a vacuum line, in the normal position of the pan, and other means for establishing communication between the said conductor and a compressed-air line in the dumping position of the said pan, the center of gravity of the empty pan structure and the outlet of the pan, in the normal position, being located considerably above the axis of the said shaft and conductor.

2. A filter, including in combination, a filter pan rotatable about an axis and having a normal position and an inverted position, the inversion of the said pan being energetically motivated by gravity, a rotatable conductor for liquid leading out of the pan, said pan being at least partially supported by said conductor, a frame having side members near whose extremities the said rotatable conductor is mounted in such a manner that in the normal position, a substantial portion of the pan overhangs the axis of rotation and extends beyond the said extremities, means for establishing a vacuum connection with said conductor in one position of the pan, and means for establishing a compressed-air connection through the same conductor in the other position of the pan; the said combination being so disposed that the center of gravity of the empty pan in its normal position, is considerably above the rotatable conductor.

3. A filter pan having a normal position and an inverted position, means including a hollow shaft on which said pan is mounted for moving from the normal position to the inverted position, and vice versa, a source of vacuum connected to the hollow shaft, a source of compressed air connected to the hollow shaft, means for controlling communication between the hollow shaft and the vacuum source in one position of the filter pan, means for controlling communication between the hollow shaft and the compressed-air source in the other position of the said filter pan, and a frame on which the said filter pan is operably supported, the said frame including two side members joined by a rear cross-member, and a mounting for the first-mentioned means disposed near the front extremities of the said side members, to the end that the space in front of the filter pan is unobstructed and the angular swing of the pan during inversion is limited by contact of the pan with a portion of the frame, to substantially 180 degrees.

LIONEL E. BOOTH.